Oct. 10, 1961   G. B. LANGFORD ET AL   3,003,842
METER RECORD DEVICE AND METHOD
Filed Jan. 13, 1958

*Inventors*
GEORGE B. LANGFORD
PATRICK E. CAVANAGH by: J. Richard Cavanagh
Patent Agent

United States Patent Office 3,003,842
Patented Oct. 10, 1961

3,003,842
METER RECORD DEVICE AND METHOD
George B. Langford, 88 Queensbury Ave., Toronto, Ontario, and Patrick E. Cavanagh, 8th Line, Oakville, Ontario, Canada, assignors of one-third to Marie Phyllis Montague, Toronto, Ontario, Canada
Filed Jan. 13, 1958, Ser. No. 708,635
2 Claims. (Cl. 346—14)

This invention relates to a meter record device and to the method of recording meter readings such as the reading of a power or water meter of the domestic type which may be externally mounted on a house or building.

Heretofore various methods and apparatus have been proposed for the automatic reading of meters of different type. Any water or power company serving a community requires information concerning the consumption of water or power at each service installation at a private residence or building. In some instances the householder may be required to read a power or water meter and make an entry on a card which is then mailed to the servicing company. The information is then extracted from the card by visual means, a computation made and a bill sent for the power or water consumed.

Previous attempts to reduce the number of operations involved in the billing of a customer have not been practical for commercial application for a number of reasons, largely due to the complication and expense of installation. Such prior devices are mainly of the kind providing for an electric commmunciation of a reading from each service installation to a main office at which cards or other indexing devices may be punched or processed to represent the consumption of power or water of the installation. Needless to say the commmunciating wiring itself represents an onerous expense. Another method of attempting simplification of the record process comprises the provision of metering mechanisms of quite different construction. By such device a printed record is provided automatically for mailing by the householder, while a more accurate record is thus obtained, there is nothing of value gained which could not otherwise be achieved by making a visit to the premises since these meter readings are of the cumulative type. The problem to be solved as recognized by prior art is not thought to be the true problem to be solved as set forth by this invention wherein recognition is given to primary difficulties to be overcome by any recording method satisfactory for use in present metering systems. Accordingly the invention recognizes that it is desirable to overcome visual difficulties which arise in the householder obtaining a record of the meter reading. Secondly, it is desirable to provide some means suitable for automatically converting the record obtained by the householder to the charge to be billed to the householder without requiring visual inspection by either the householder or personnel making up the bills to the householder. Additionally it is a further and necessary requirement that any proposed methods or apparatus must be of a nature adaptable for interior or exterior use on meter reading equipment of conventional design and function.

It is the main object of the invention to satisfy the requirements of the problem recognized herein by accomplishing a magnetic recording of the positions of the meter hands or wheels of a conventional watt hour meter, water meter or the like and to utilize the recording to extract information therefrom automatically by conventional processing methods to obtain an invoice or bill corresponding to the recorded information.

Other objects of the invention will be appreciated by a study of the following specification taken in conjunction with the accompanying drawings.

Figure 3:
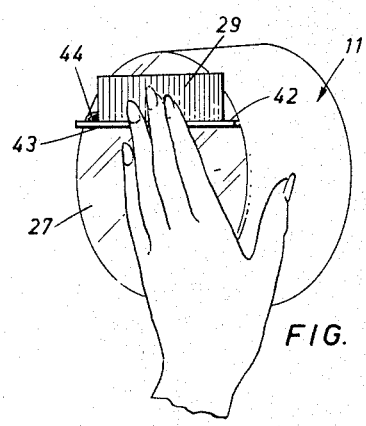
FIGURE 3 illustrates the method of obtaining a meter reading record according to the invention by applying to the meter of FIGURE 2 a record card or sheet containing a dispersion of magnetic iron oxide particles according to the invention.
Figure 5:
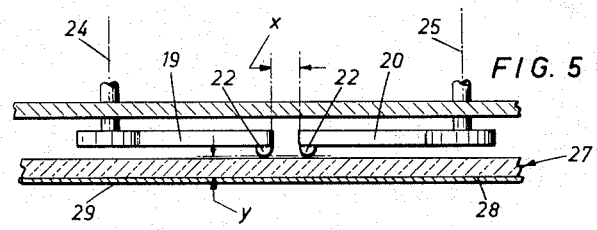
FIGURE 5 is a sectional view on the line 5—5 of FIGURE 1 illustrating the geometric relation between the permanent magnets on the dial arms of the invention and the spacing of the record card or carrier therefrom when lying against the outer surface of the glass covering or casing of the meter.
Figure 4:
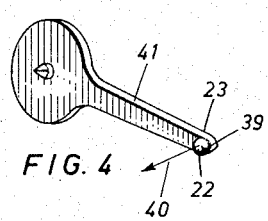
FIGURE 4 is a perspective view of a conventional watt hour meter dial arm having a permanent magnet mounted thereon according to the invention.

Referring to the drawings a dial plate 10 of a conventional watt hour meter 11 may carry a plurality of dial markings 12, 13, 14, 15 and 16 having corresponding dial arms 17, 18, 19, 20 and 21. The construction is intended to be conventional with the exception that each of the dial arms 17 to 20 carries a permanent magnet 22 at the outward end 23 thereof, as indicated in FIGURE 4. The permanent magnet may be in the form of a small permanent magnet ball of the order of one-sixteenth inch in diameter as shown in FIGURE 5. The spacing between the axes of rotation 24 and 25 of adjacent dial arms 19 and 20 should be such as to establish a predetermined distance "x" between the permanent magnets on the free ends thereof at their positions of nearest proximity as illustrated. According to the invention the glass or other non-magnetic cover 27 of meter 11 in the region overlying the various dial arms should be of an outer surface distance "y" less than the dimension "x" and preferably of the order of one-half "x." Thus the outer surface 28 of cover 27 should be spaced sufficiently close to the permanent magnet 22 that the information record carrier 29 in the form of a card or other sheet, as hereinafter described, placed in the outer surface 28 as illustrated in FIGURE 3 will be nearer to either of the permanent magnets than each permanent magnet will be to the other permanent magnet.

The maximum magnetic effect on the information record carrier 29 may be accomplished by orienting each of the permanent magnets 22, as indicated in FIGURE 4, in a manner such that one pole such as the north pole indicated may be directed outwardly. Preferably all such permanent magnets have the same magnetic pole directed outwardly so that the proximate condition, as indicated in FIGURE 5, of two such magnets will tend to maintain a separation of their individual magnetic fields.

Figure 6:
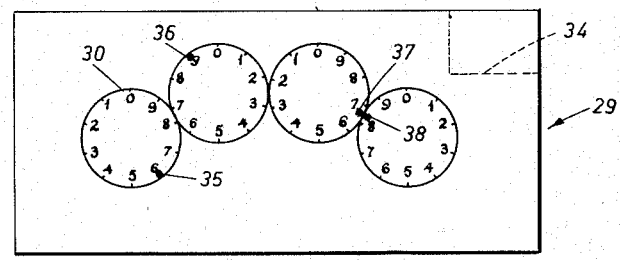
FIGURE 6 is an illustration of one suitable form of record carrier card according to the invention revealing, for purposes of discussion, marks at predetermined locations thereon corresponding to the positions of the dial arms in FIGURE 1 as a result of magnetizing the information carrier card.

The information carrier 29 may be provided in the simple form of a paper card having a magnetizable coating thereon such as the coating utilized in the coating of so called paper magnetic tapes used in conventional tape recording devices. Preferably, however, the information carrier is provided in sheet like form of a rectangular nature, indicated in FIGURE 6, formed of a sheet of plastic material containing a suspension of micro-particles of a magnetizable substance as magnetic iron oxide. If desired, the carrier sheet 29 may carry printed matter 30 corresponding to the number of the dials on the dial face 10. The carrier sheet may carry any other information of punched, printed or other magnetic form for the purpose of identifying a customer. Thus the dial face 10 may carry additional permanent magnets 31, 32 and 33 in predetermined relative spacing for forming a further magnetic image on the carrier sheet whereby to identify the customer or to identify any other characteristic of the installation.

Figure 1:
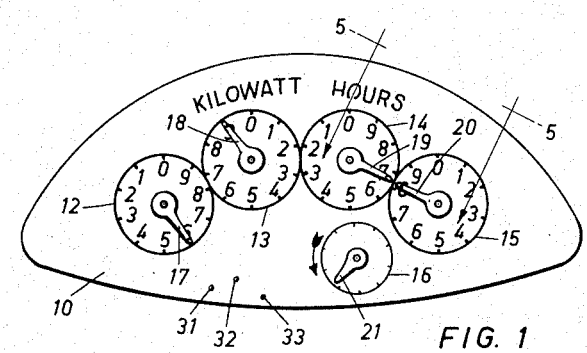
FIGURE 1 is a view of a meter face of a conventional watt hour meter of the domestic type.
Figure 2:
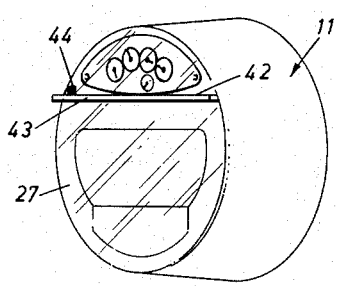
FIGURE 2 illustrates a conventional glass covered watt hour meter having a shelf edge formed in the glass cover thereof as a modification of a meter housing according to the invention.

The invention also contemplates that the carrier sheet may carry a postage stamp in the chain lined area 34 and have additional printing thereon whereby the same is utilized substantially as a post-card mailed from the invoicing office of the servicing utility company once a month or at any desired billing period. The customer then may, upon receipt by mail, apply the card or sheet in the manner indicated in FIGURE 3 to the face of the meter. In operation the positions of the various permanent magnets described causes the carrier sheet to be magnetized in local areas 35, 36, 37 and 3 corresponding to the relative positions of the dial arms 17 to 20 indicated in FIGURE 1 by way of example. The customer then remails the card or carrier sheet to the invoicing office of the servicing utility company. Thereafter the card or sheet is processed through a conventional magnetic transcribing apparatus similar to playback tape recording devices to sense the location of magnetized areas on the card. If preferred the magnetized image areas may be developed out by immersing the card in a colloidal suspension of magnetite in a suitable vehicle such as alcohol whereby the dark coloured colloid particles cling to the magnetized areas to reveal the location of such areas enabling a visual reading to be made over the printed dial indicators 30. As an alternative, the card may be automatically processed by the co-ordinate extraction of information therefrom by playback devices adapted to punch cards for filing, processing and billing or adapted directly to provide printed invoices from conventional information processing computers of established usage.

In the preferred form the permanent magnets 22 may be mounted in the free end 23 of a dial arm such that the magnet ball described is seated into a socket (not shown) drilled into the end of the arm. The edges 39 of the socket are then suaged about the ball partially to enclose the same within the socket and to retain it in mounted position therein with the field thereof oriented in a predetermined direction as indicated by the North arrow 40. For this purpose the arm 41 should be formed of a non-magnetic material such as aluminum or brass.

Preferably also an information carrier locating surface 42 in the form of a shelf 43 is provided on the housing 11 and may include a shoulder 44 whereby to assist in correct manual location of information carrier sheet 29, as indicated in FIGURE 3. Specific locating means are not deemed essential for purposes of the invention. The modification of the housing 11 would in such instance involve the provision of new glass covers for meters.

It is intended that the present disclosure should not be construed in any limiting sense other than that indicated by the scope of the following claims having regard to the prior art.

We claim:

1. In a cumulative metering system including a meter having a plurality of dial means thereon, the combination therewith of: a housing enclosing said dial means, said housing being formed of a non-magnetic material; a movable dial indicator for each of said dial means, said indicators being formed of a non-magnetic material; a permanent magnet mounted at the outer extremity of each of said indicators and movable therewith in a recording position adjacent and within said housing, said magnets on adjacent dial means being movable to positions of predetermined minimum spacing, one from another; means supporting said housing in a position closely overlying said magnets, the distance between the outer surface of said housing and said magnets being less than said predetermined spacing; an information carrier member in the form of a rectangular sheet and carrying thereon a relatively uniformly dispersed suspension of a magnetizable substance; a carrier member supporting surface on said housing adapted for placement of said member thereon by an operator to provide local magnetization of said member by said magnets through said housing; and means supporting said magnets on said indicators in positions of mutually repelling magnetic field orientation when disposed in recording position.

2. In a cumulative metering system including a meter having a plurality of dial means thereon, the combination therewith of: a housing enclosing said dial means, said housing being formed of a non-magnetic material; a movable dial indicator for each of said dial means, said indicators being formed of a non-magnetic material; a ball-shaped permanent magnet mounted at the outer extremity of each of said indicators and movable therewith in a recording position adjacent and within said housing, said ball-shaped magnets on adjacent dial means being movable to positions of predetermined minimum spacing, one from another; means supporting said housing in a position closely overlying said ball-shaped magnets, the distance between the outer surface of said housing and said ball-shaped magnets being less than said predetermined spacing; an information carrier member in the form of a rectangular sheet and carrying thereon a relatively uniformly dispersed suspension of a magnetizable substance; a carrier member supporting surface on said housing adapted for placement of said member thereon by an operator to provide local magnetization of said member by said ball-shaped magnets through said housing; and means supporting said ball-shaped magnets on said indicators in positions of mutually repelling magnetic field orientation when disposed in recording position.

References Cited in the file of this patent

UNITED STATES PATENTS

| | | |
|---|---|---|
| 504,159 | Herrick | Aug. 29, 1893 |
| 1,178,746 | Mutton | Apr. 11, 1916 |
| 2,333,463 | Bryce | Nov. 2, 1943 |
| 2,561,476 | Lang | July 24, 1951 |
| 2,757,062 | Hood | July 31, 1956 |
| 2,760,840 | Gordon | Aug. 28, 1956 |